3,586,714
PROCESS FOR PREPARING SORBIC ACID
Mario Dubini and Mario Ferraris, Novara, Sergio Merzoni, Milan, and Gian Paolo Chiusoli, Novara, Italy, assignors to Montecatini Edison S.p.A.
Filed June 10, 1968, Ser. No. 735,9006
Claims priority, application Italy, June 12, 1967, 17,098/67
Int. Cl. C07c 57/10
U.S. Cl. 260—526                             4 Claims

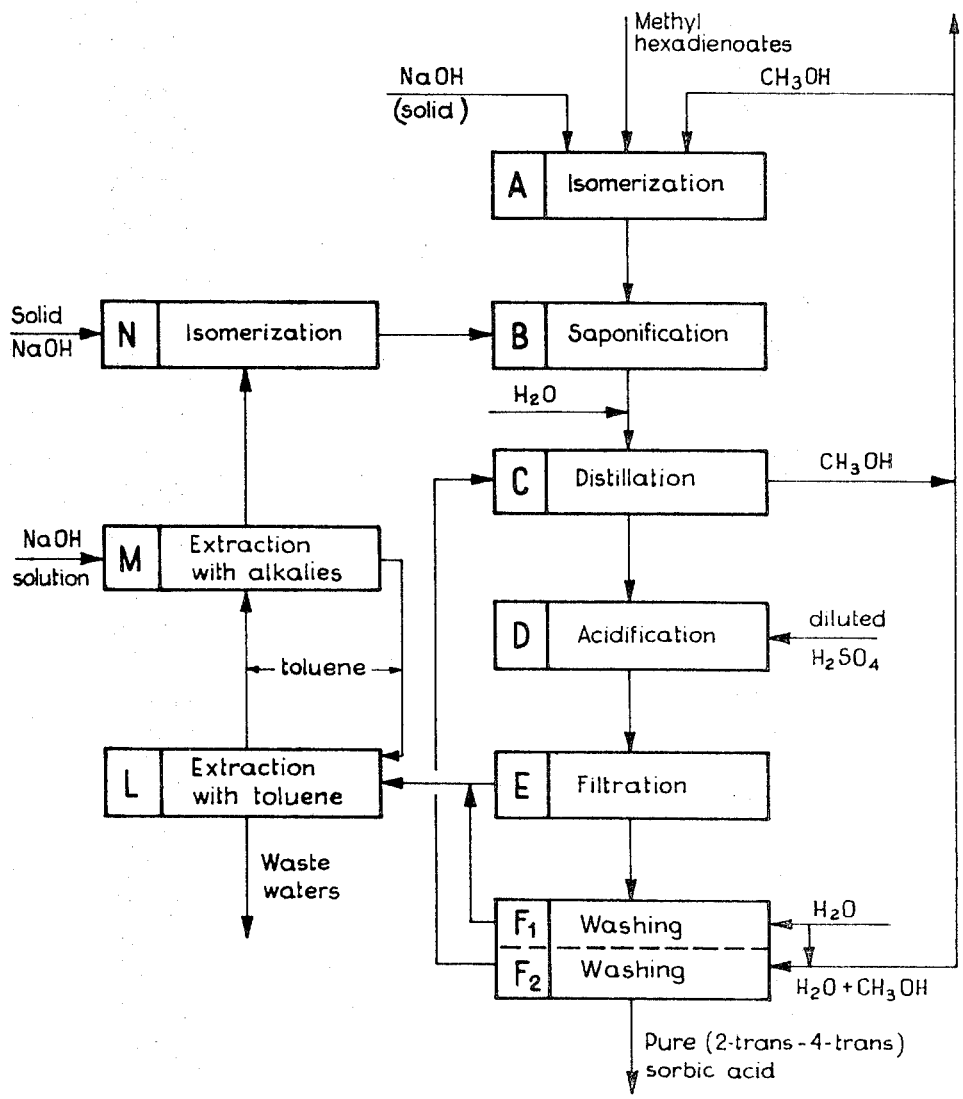

ABSTRACT OF THE DISCLOSURE

Described is a process for preparing 2-trans-4-trans sorbic acid from pure methyl 2-cis-5, 2-trans-5, 3-trans-5 hexadienoate or from mixtures thereof. The process is characterized by the following steps: Methyl hexadienoate is dissolved in methanol, using 0.5 to 1 part of methanol per 1 part of ester; solid sodium hydroxide is added in amount from 0.5 to 3% by weight in respect of the ester and the whole is agitated at 20–40° C. for 60–120 minutes (step A); sodium hydroxide is added in stoichiometric amount for the saponification and the whole is heated to 60–80° C. for 60–120 minutes under stirring (step B); water is added in amount from 0.5 to 1.5 volumes of water per volume of solution in order to dissolve the salts, and the methanol is distilled (step C); the solution is acidified to pH of 3.5 with 5–15% sulfuric acid (step D); after filtration at between 30 and 40° C. (step E), the filter cake is washed with water and with aqueous methanol (step F) thus obtaining 2-trans-4-trans sorbic acid, with a purity higher than 99%.

Our invention relates to a process for preparing sorbic acid (2-trans-4-trans-hexadienoic acid) from pure 2-cis-5, 2-trans-5 and 3-trans-5 hexadienoic esters or from mixtures thereof.

As is known, the 2-trans-4-trans isomer of sorbic acid is commonly used in foodstuff industry as antifermentative and preservative.

Our process makes it possible to obtain sorbic acid with high yields from hexadienoic esters, with an alkali consumption corresponding to the stoichiometric amount required for transforming the ester into the corresponding alkaline salt. Moreover, by using suitable reaction conditions it is possible to separate, in a very economic manner, 2-trans-4-trans sorbic acid from its isomers, thus obtaining a highly pure product, with a purity higher than 99%.

The pure sorbic acid thus obtained is particularly suitable for transformation by salification into high purity potassium sorbate, which is used in the food industry as equivalent of sorbic acid.

It is known that olefin compounds can be isomerized by alkali (NaOH, KOH). By treating methyl 2-cis-5 or 2-trans-5 hexadienoate with small amounts of alkali, methyl 3-trans-5-hexadienoate is obtained, which is then isomerized to 2,4 in the various stereoisomeric forms, including 2-trans-4-trans.

We have now found that, in order to obtain the highest yields (about 90%) of 2-trans-4-trans, it is necessary to operate with sodium hydroxide in a medium of almost anhydrous methanol in order to minimize the saponification reaction. The saponification reaction not only causes the formation of sodium hexadienoates, in which the 3-trans-5 isomer is prevailing, but also decreases the alkalinity of the medium thus preventing the transformation into 2-trans-4-trans (see Tables 1 and 3). For the same reason, an alkali excess must be avoided.

In methanol solution, the temperature remarkably influences the side reactions of saponification and formation of methoxy derivatives. For instance, when methyl 2-cis-5-hexadienoate is isomerized in methanol with 2% of NaOH, by passing from 30° to 50° C., the yield of methyl 2-trans-4-trans-hexadienoate decreases from 90.1% to 86.1% (Tables 2 and 3). By increasing the temperature, the phenomenon is increased. Analogous phenomena are noted when starting from methyl 2-trans-5 and 3-trans-5 hexadienoate.

TABLE 1.—ISOMERIZATION AT 55° C. IN THE PRESENCE OF WATER (10 g. of 2-cis-5-hexadienoic ester, 10 cc. of $CH_3OH$, 0.2 g. of NaOH in 30% aqueous solution, temperature 55° C., agitation for 75 minutes)

| Isomers | Grams | | | | | | |
|---|---|---|---|---|---|---|---|
| | 2-cis-5 | 2-trans-5 | 3-trans-5 2-cis-4-trans | 2-trans-4-cis | 2-trans-4-trans | Methoxy | Total |
| Methyl ester | 0.5 | 0.07 | 6.07 | 0.1 | 2.59 | | 9.33 |
| Sponified ester | 0.01 | | 0.65 | | 0.01 | | 0.67 |
| Total weight | 0.51 | 0.07 | 6.72 | 0.1 | 2.60 | | 10.00 |

TABLE 2.—ISOMERIZATION IN MENTHOL AT 30° C.

(10 g. of 2-cis-5-hexadienoic ester, 10 cc. of $CH_3OH$, 0.2 g. of NaOH; temperature 30° C. agitation for 75 minutes)

| Isomers | Grams | | | | |
|---|---|---|---|---|---|
| | 3-trans-5 2-cis-4-trans | 2-trans-4-cis | 2-trans-4-trans | Methoxy | Total |
| Methyl ester | 0.23 | 0.35 | 8.76 | 0.04 | 9.38 |
| Saponified ester | 0.35 | 0.0 | 0.25 | 0.01 | 0.62 |
| Total weight | 0.58 | 0.36 | 9.01 | 0.05 | 10.00 |

TABLE 3.—ISOMERIZATION IN MENTHOL AT 50° C.

(10 g. of 2-cis-5-hexadienoic ester, 10 cc. of CH₃OH, 0.2 g. of NaOH; temperature 50° C. agitating for 75 minutes)

| Isomers | Grams | | | | |
|---|---|---|---|---|---|
| | 3-trans-5 2-cis-4-trans | 2-trans-4-cis | 2-trans-4-trans | Methoxy | Total |
| Methyl ester | 0.24 | 0.36 | 8.00 | 0.15 | 8.75 |
| Saponified ester | 0.59 | 0.02 | 0.61 | 0.03 | 1.25 |
| Total weight | 0.83 | 0.38 | 8.61 | 0.18 | 10.00 |

In the drawing the single figure schematically shows our process for preparing 2-trans-4-trans sorbic acid from a methyl hexadienoate.

The process is characterized by the following stages:

A small amount of solid sodium hydroxide (0.5–3% by weight in respect of the ester) is added to a methanol solution of a methyl hexadienoate (from 0.5 to 1 part by weight of methanol per 1 part of ester) and the whole is agitated, at a temperature between 20° and 40° C. The isomerization reaction (step A) is extremely rapid. After 10 minutes 75–80% of methyl 2-trans-4-trans hexadienoate and after 60 minutes 85–90% are obtained. (With longer times the total amount of 2-trans-4-trans increases but at a lower rate, so that on industrial scale the reaction is conveniently stopped after 75–120 minutes.) At the end of the reaction, the mixture contains not only methyl 2-trans-4-trans hexadienoate but also other isomers, such as 2-cis-4-trans, 2-trans-4-cis and 3-trans-5, and an amount not higher than 1% of a mixture of methoxy derivatives (methyl 5-methoxy-3-hexenoate, methyl 5-methoxy-2-hexenoate, methyl 3,5-dimethoxyhexanoate) formed by side reactions with methanol.

To the mixture obtained in step A, a stoichiometric amount of alkali (preferably sodium hydroxide) is added which, by heating to 60–80° C. for 60–120 minutes under stirring, transforms the esters into the corresponding alkaline salts (step B: saponification).

Water is added until complete solubilization of the salts (from 0.5 to 1.5 volumes of water per volume of solution) and methanol is removed by distillation (step C). The methanol can be recovered and reused for further preparation.

The solution obtained in step C is acidified to pH 3.5 with 5–15% sulfuric acid (step D).

Filtration at a temperature between 30° and 40° C. Under these conditions, 2-trans-4-trans-hexadienoic acid is separated from its isomers more soluble in water (step E).

The solid obtained is washed with water (about 2 cc. per g.) and with an aqueous methanol solution containing 20–40% by volume of CH₃OH (about 2 cc. per 1 g. of acid). After the washings (step F), the solid is found to be 2-trans-4-trans sorbic acid with a purity higher than 99%.

The aqueous washing solution is added to the filtration waters and the whole is sent to the extraction with toluene (step L). The aqueous-methanol solution after washing is sent to the distillation of methanol (step C).

To obtain pure potassium sorbate, the sorbic acid obtained above is suspended in water and neutralized with a KOH solution to a pH of 8.4. The resulting solution contains from 20 to 40% of potassium sorbate. A small amount of activated carbon is added (from 0.1 to 1% by weight with respect to the potassium sorbate) and the whole is agitated for some minutes. The suspension is then filtered in order to remove the exhausted carbon. Methanol and water are evaporated and the product is dried. Potassium sorbate having the following characteristics is thus obtained:

purity by U.V. examination: 100.1%
total unsaturation: 99.5%
color: 20 APHA

The yields of transformation of hexadienoic esters into sorbic acid are increased by adding the acid waters coming from filtration E to the washing waters F1 and then extracting with toluene (step L), using 0.5 to 1 cc. of toluene per 1 cc. of solution.

The hexadienoic acids and methoxy acids dissolved in toluene are extracted with an aqueous 5–15% NaOH solution, containing the alkali in amounts corresponding to 2–5 times the calculated amount (step M). Toluene can thus be reused for the extraction of other acid waters, thus obtaining a remarkably economic extraction cycle which does not alter at all the extracted acids.

The alkaline solution, coming from the treatment of toluene (step M) is mixed with solid NaOH up to a NaOH concentration of 30% and is heated at between 90 and 120° C. while agitating for some hours, in general for 1.5 to 3 hours (step N: second isomerization). By this treatment, the mixture of sodium salts of hexadienoic acid and methoxy acids, containing only 20–30% of 2-trans-4-trans hexadienoic acid, is transformed into a mixture which is more than 93% 2-trans-4-trans hexadienoic acid.

The alkaline suspension is used as such for the saponification of methyl 2-trans-4-trans hexadienoate (step B). In this way the alkali excess, coming from the second isomerization, is completely reused in the saponification. The alkaline suspension contains the stoichiometric amount of sodium hydroxide for the saponification step.

By the process, which is the object of the present invention, it is possible to transform methyl hexadienoates into 2-trans-4-trans sorbic acid and this in turn into potassium sorbate with almost quantitative yields, thereby avoiding costly purification and crystallization cycles since the mild treatments described herein reduce to a minimum the formation of colored and polymeric side products.

The cycle of preparation of 2-trans-4-trans sorbic acid from hexadienoic esters is schematically shown in the figure, together with the relevant recycles of recovery of the solvents and will be described further with respect to the following examples which illustrate the invention without limiting its scope.

EXAMPLE 1

A solution of 1 g. of NaOH in 50 cc. of methanol is charged in a 1-liter flask provided with agitator, dropping funnel, condenser and thermometer. Under an inert atmosphere, 50.2 g. of methyl 2-cis-5-hexadienoate are introduced and the whole is agitated at 30° C. for 75 minutes. After isomerization (step A), the methyl 2-trans-4-trans-hexadienoate content is 90.0%. 59 g. of 30% NaOH aqueous solution, containing 4.5 g. of hexadienoic acid, are added to the light yellow solution. This solution comes from the secondary isomerization (step N) described hereinbelow. The saponification (step B) is carried out by heating to 75° C., for 90 minutes. After addition of 100 cc. of water, methanol is removed by distillation (step C) and can be recycled. The solution is cooled to 35° C., acidified with 10% H₂SO₄ to pH 3.5 (step D) and filtered (step E). The solid obtained is washed (step F) with 100 cc. of water after pulping, and with 100 cc. of aqueous methanol (25% methanol by volume). The washing water is added to the acid filtration waters while aqueous methanol which contains 0.25 g. of hexadienoic acids (2-trans-4-trans=85.3%) is sent to distillation C of methanol for its recovery.

The solid, after the washings, is white and the analysis thereof shows that it consists of sorbic acid (2-trans-4-trans hexadienoic acid) with a purity higher than 99%. Obtained were 43.3 g. of acid (yield of 97% in respect of methyl hexadienoate).

The solid is suspended in 20 cc. of water and neutralized with an aqueous 20% KOH solution, adjusting the pH to 8.4. The solution obtained, after addition of 0.2 g. of activated carbon powder, is agitated for 5 minutes and filtered. After drying in a rotating evaporator, 57.9 g. of potassium sorbate (yield of 96.9% in respect of methyl hexadienoate) having the following characteristics are obtained:

purity by U.V. examination: 100.1%
total unsaturation: 99.5%
acidity (as sorbic acid): 0.12%
loss by drying: 0.06%
color: 20 APHA
heavy metals: <10 p.p.m.

The light yellow acid waters (680 cc.) coming from the filtration of sorbic acid (step E) are extracted (step L) with toluene (4 times with 95 cc.). The organic layer, which contains 4.5 g. of a mixture of hexadienoic acids (2-trans-4-trans 21.5%), is extracted with 46 g. of aqueous 10% NaOH (step M). Further 13 g. of NaOH are added to the aqueous solution which is then heated to 105° C. for 2 hours while agitating (step N). The suspension thus obtained is used for the above-described saponification B of methyl hexadienoate.

EXAMPLE 2

A solution of 1 g. of NaOH in 50 cc. of methanol is charged in the 1-liter flask described in Example 1. 50 g. of methyl 2-trans-5-hexadienoate are introduced and the whole is agitated under an inert atmosphere at 30° C. for 120 minutes. At the end of the reaction, the methyl 2-trans-4-trans hexadienoate content is 86%.

By operating as described in Example 1, there are obtained 51.2 g. of sorbic acid which are transformed into 57.5 g. of potassium sorbate, having the characteristics of the sorbate of Example 1. The yield is 96.8% with respect to the starting methyl 2,5-hexadienoate.

EXAMPLE 3

A solution of 1 g. of NaOH in 50 cc. of methanol is charged in the 1-liter flask of Example 1. 50 g. of methyl 3-trans-5-hexadienoate are introduced and the whole is heated to 30° C. for 120 minutes. At the end of the reaction the methyl 2-trans-4-trans hexadienoate content is 90.1%. By operating as described in Example 1, 51.5 g. of sorbic acid are obtained which are transformed into 57.5 g. of potassium sorbate having the characteristics of sorbate of Example 1. The yield is 96.9% with respect to the starting methyl 3,5-hexadienoate.

EXAMPLE 4

A solution of 1 g. of NaOH in 50 cc. of methanol is charged in the 1-liter flask of Example 1. 50 g. of a mixture consisting of 22% of methyl 3-trans-5-hexadienoate and 78% of methyl 2-cis-5 hexadienoate are introduced and the whole is heated to 30° C. for 105 minutes. At the end of the reaction, the methyl 2-trans-4-trans hexadienoate content is 90.2%. By operating as described in Example 1, 51.4 g. of sorbic acid are obtained, which are transformed into 57.65 g. of potassium sorbate having the characteristics of the sorbate of Example 1. The yield is 96.85% with respect to the starting hexadienoates.

We claim:
1. A process for preparing 2-trans-4-trans sorbic acid from pure methyl 2-cis-5, 2-trans-5, 3-trans-5 hexadienoate and mixtures thereof, which comprises:

dissolving methyl hexadienoate in methanol, using 0.5 to 1 part of methanol per 1 part of ester, adding from 0.5 to 3% by weight, in respect of the ester, solid sodium hydroxide and agitating the whole at 20–40° C. for 60–120 minutes, adding sodium hydroxide in stoichiometric amount for the saponification and heating the whole to 60–80° C. for a period of 60–120 minutes under stirring, adding from 0.5 to 1.5 volumes of water per volume of solution in order to dissolve the salts and distilling off the methanol, acidifying the solution to pH of 3.5 with 5–15% sulfuric acid, filtering at between 30 and 40° C. and washing the filter cake with water and with aqueous methanol to obtain 2-trans-4-trans sorbic acid, with a purity higher than 99%.

2. The process of claim 1, wherein the acid filtration waters and the washing waters are mixed and extracted with toluene in order to recover the hexadienoic acids in said waters.

3. The process of claim 2, wherein the hexadienoic acids are extracted from the toluene solution by a 5–15% NaOH aqueous solution and recycling the toluene, deprived of the acids, to the extraction of the acid waters.

4. The process of claim 3, wherein the alkaline solution of hexadienoic acids is mixed with solid NaOH up to a NaOH concentration of 30%, heated to 90–120° C. for some hours and then sent to saponification of methyl 2-trans-4-trans hexadienoate.

References Cited
FOREIGN PATENTS

| 868,028 | 5/1961 | Great Britain | 260—526 |
| 6501581 | 2/1965 | Netherlands | 260—526 |

JAMES A. PATTEN, Primary Examiner

U.S. Cl. X.R.

260—486